Figure 1:
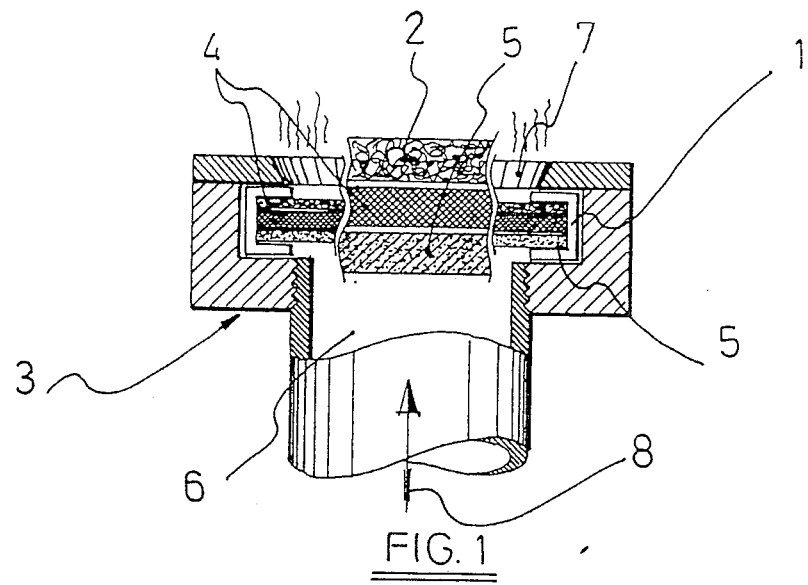

United States Patent [19]

Losfeld et al.

[11] Patent Number: 4,810,587
[45] Date of Patent: Mar. 7, 1989

[54] LAMINATED OBJECT COMPRISING METAL FIBRE WEBS

[75] Inventors: Ronny Losfeld, Waregem; Ignace Lefever, Deerlijk, both of Belgium

[73] Assignee: N.V. Bekaert S.A., Belgium

[21] Appl. No.: 930,496

[22] Filed: Nov. 14, 1986

[30] Foreign Application Priority Data

Nov. 28, 1985 [BE] Belgium .................. 1/011387

[51] Int. Cl.[4] .................. B22F 7/00; F23D 14/12
[52] U.S. Cl. .................. 428/549; 431/328
[58] Field of Search .................. 428/547, 548, 549; 431/328

[56] References Cited

U.S. PATENT DOCUMENTS

| | | | |
|---|---|---|---|
| 2,050,298 | 8/1936 | Everett | 205/21 |
| 3,262,190 | 7/1966 | Rostoker et al. | 29/157.3 |
| 3,277,564 | 10/1966 | Webber et al. | 29/419 |
| 3,291,577 | 12/1966 | Davies | 428/549 |
| 3,394,213 | 7/1968 | Roberts et al. | 264/174 |
| 3,469,297 | 9/1969 | Webber | 29/180 |
| 3,490,902 | 1/1970 | Fisher | 75/208 |
| 3,920,583 | 11/1975 | Pugh | 252/465 |
| 4,597,734 | 7/1986 | McCausland et al. | 431/328 |

FOREIGN PATENT DOCUMENTS

| | | |
|---|---|---|
| 157432 | 10/1985 | European Pat. Off. |
| 876435 | 8/1961 | United Kingdom |
| 1190844 | 5/1970 | United Kingdom |
| 1468093 | 3/1977 | United Kingdom |

OTHER PUBLICATIONS

Toyota Motor KK Abstract dated Jan. 23, 1981 (1 page) published in Japan.

Primary Examiner—Margaret A. Focarino
Attorney, Agent, or Firm—Cushman, Darby & Cushman

[57] ABSTRACT

Laminated object comprising sintered metal fibre webs at least one web of which consists of application-active metal fibres joined to an adjacent mixed-fibre web and a carrier. Depending on the nature of the active fibres, the object is e.g. applicable in membranes for radiant burners, in catalysts and wear-resistant seals.

21 Claims, 1 Drawing Sheet

U.S. Patent    Mar. 7, 1989    4,810,587

LAMINATED OBJECT COMPRISING METAL FIBRE WEBS

The invention relates to laminated porous objects comprising various layers of metal fibre webs that are bonded together in the interfaces by a sintering operation, the metal fibre composition differing in at least two adjacent layers.

It is well known to sinter together metal fibre webs, the fibre diameter in one layer differing from the fibre diameter in the adjacent layer or layers. Such metal fibre webs are, e.g. described in British Pat. No. 1,190,844, which also specifies a method of forming metal fibres through bundled drawing. For a number of applications of porous metal-fibre sheets as in catalytic reaction media, for electrodes, radiant burners and in various other cases, a pronounced resistance is required, be it to high temperature, to fluctuations of temperature, to abrasion, to oxidation or to other chemical corrosion or physical or mechanical disintegration.

The metallic alloys that have to meet these specific requirements and the fibres made thereof often are very expensive and/or relatively brittle and are therefore only utilized where strictly needed and preferably in minimal quantities. Consequently, the minimal quantities of these specific application-active fibres are processed into thin porous webs and combined with one or several layers of a cheaper and/or less brittle material. However, in order to be able to realize a good and durable bond between said active fibre layer and the layers of another material, it is necessary to provide one or more porous transition layers comprising a mixture of active fibres and other metal fibres.

Consequently, the invention provides a laminated object of metal fibre webs sintered on top of each other wherein at least one web comprises active fibres and which web is adjacent to a mixed-fibre web comprising a mixture of the active fibres and other metal fibres which can be attached to the active fibres by a sintering operation.

The mixed-fibre web will often act as intermediate layer between a web of active fibres and a carrier or support whereto it can be joined or attached by e.g. sintering or brazing or adhering. The support can e.g. be a network or a sheet or plate.

The support itself can also totally or partly consist of a metal fibre web in contact with the mixed-fibre web. The metal fibres in the support web will then preferably be the same as the other (non-active) metal fibres in the mixed-fibre web. Thus, they will be able to form a firm bond with these other fibers as they are attached together by sintering.

Thus, the laminated and sintered porous combination of active-fibre web, mixed-fibre web and support web forms a structure which easily lends itself to further processing, handling and deformation (bending, folding, welding), mechanical damage of the active-fibre web (through breaking or tearing during treatment) being prevented.

The mixed-fibre web constitutes a key element of the invention as compatible bridge connection between active fibres and the other layers in the laminated object. In many cases, it will be advantageous and even necessary to procure an adjustable and as even as possible distribution and mixture of the various fibre types throughout both the surface and the thickness of the web. This is e.g. obtained by controlling the input quantities of the various fibre types to the web forming device.

In order to be able to produce a web with sufficient intrinsic cohesion for further processing, the total weight of the mixed-fibre web will have to amount to at least approximately 50 g/m$^2$. A practically equal quantity by weight of active fibres and non-active fibres will generally be incorporated in the mixed-fibre web although the proportion can be freely adjusted in accordance with specific bonding requirements between acive fibre web and support.

If the mixed-fibre web is to have a total weight of at least 150 g/m$^2$ it can be composed of a number of thin layers of approximately from 50 to 100 g/m$^2$ each, by alternately applying layers of active fibres and layers of non-active fibres. Indeed, these layers are thin and highly porous so that when compacting and sintering the built-up stack, the fibres of one layer penetrate to some extent between the fibres of each adjacent layer thus creating a certain mixture. This laminated structure of very thin webs is also regarded as being an embodiment of a mixed-fibre web (hence covered by the concept of mixed-fibre web in accordance with the invention).

It is advisable in certain cases to provide mixed-fibre webs having a concentration gradient of active fibres through their thickness. The highest concentration (weight ratio) of active fibres will then be chosen in the mixed-fibre web surface that is to constitute the contact or boundary layer interface with the web of active fibres (that is) to be joined to it. The concentration of this contact layer will e.g. be approximately 75%. The mixed-fibre web with concentration gradient will in fact be composed of a number of superposed mixed-fibre sub-webs comprising mutually different active-fibre concentrations. For a combination of sub-webs intended as intermediate layer joining an active-fibre layer to a support web of other metal fibres, a three-layer structure can be made up of active-fibre concentrations of 75, 50 and 25 wt. pct. respectively. Each sub-web will then weigh at least 50 g/m$^2$ and the sub-webs can be cross-laid if desired. This entails that the orientation of a sub-web (i.e. the direction wherewith it leaves the web forming machine) in the mixed-fibre laminate differs from that of an adjacent sub-web. This concentration gradient procures a gradual transition between active and non-active fibres thus efficiently and durably preventing a delamination tendency in the interfaces and inside the intermediate layer upon repeated folding or due to mechanical or thermal shocks. Of course a portion of the non-active fibres in the mixed-fibre webs can be intended only as non-active filling having e.g. some reinforcing effect. Active and non-active fibres in the mixed-fibre webs can furthermore at least partly differ in diameter. This way, a bridge can be established, if desired, between a layer of fine active fibres on the one side and a layer of coarser fibres in the support web or network on the other side. Further, a concentration gradient can be established over more than two fibre types. With three superposed mixed-fibre webs it is e.g. possible to establish a concentration transition through the total thickness, the mixed-fibre web adjacent to the active-fibre layer comprising 50% active fibres, 25% less active fibres and 25% non-active fibres. A mixed-fibre web can be joined thereunto with 50% less active fibres and 50% non-active fibres and, subsequently, a mixed-fibre web with 25% less active fibres and 75% non-active fibres.

In accordance with another embodiment of the invention, the mixed-fibre web can constitute an intermediate layer joining two layers of active fibres which can be joined to the intermediate layer by sintering. The active fibres in the one layer can either be the same as or be different from the active fibres in the layer on the opposite side of the mixed-fibre web. The structure and composition of the mixed-fibre web or sub-webs an be freely adjusted through a modification in the dosage of active and non-active fibres during the formation of the mixed webs. For this embodiment it can even be considered to interpose between two mixed-fibre subwebs some rigid or supple sheet partition, network, honeycomb structure that can be joined and attached to the sub-webs.

Another embodiment relates to covering both sides of one or more layers of active fibres with a mixed-fibre web. This laminated structure can be covered further, at least in part, with materials that can be bonded to the respective surfaces of the two mixed-fibre webs. Here too, the structure or concentration gradient in the mixed-fibre webs can of course be freely adjusted. Similarly, a laminated structure containing centrally situated mixed webs enclosed between two layers of active fibres will be able to act as joining layer between layers that can be bonded to these active-fibre layers.

An important field of application of the invention relates to the use of laminated objects wherein active fibres are incorporated that are resistant to high-temperature oxidation. Such fibres can be manufactured by methods of bundle drawing known in the art, as described e.g. in U.S. Pat. Nos. 2,050,298; 3,277,564 or 3,394,213. Further, numerous alloy compositions are known, by themselves meeting these conditions of oxidation resistance, e.g. alloys with a base of Fe/Ni/Co-Cr-Al whether or not with small additions of Y, rare earths or Si. Less, yet still adequately resistant alloys are known under the trade names of Inconel, Haynes, Nimonic, Hastelloy and Nichrome.

These fibres can e.g. be utilised in sintered web form as radiation membrane in radiant burners for liquid or gaseous fuels, the active, oxidation resistant fibres being situated on the outside, i.e. the radiant side of the membrane in the burner.

Figure 2:
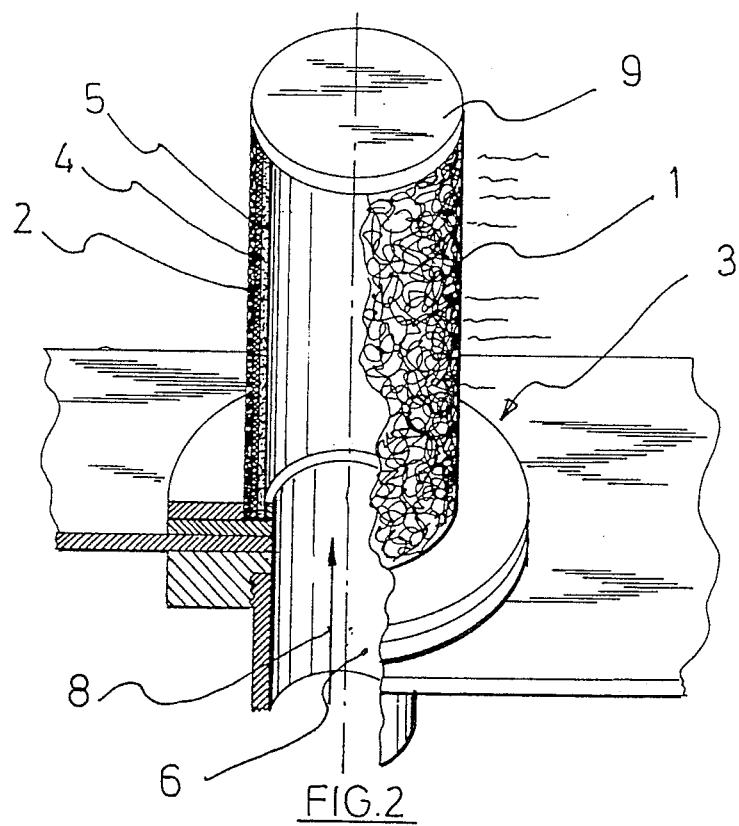

Such a burner is schematically shown in the accompanying FIGS. 1 and 2. In the embodiment of FIG. 1, the radiation membrane 1 will preferably have a porosity of between 65% and 90%. The radiant membrane can be executed as a flat structure which shuts off the supply chamber 6 of gas (e.g. natural gas) or liquid (e.g. fuel oils, diesel oil or petrol) to be combusted at its downstream end. The laminated membrane 1 will then according to the invention be composed of a sintered fibre web 2 of e.g. Fe-Cr-Al-Y-fibres with a fibre diameter of between 4 and 50 micron on the radiant side 7 of the burner 3. For application in surface burners for fuel gases, this thin surface layer 2 will have a thickness of e.g. 1 to 2 mm and will upstream (fuel flow) be bonded by sintering to a mixed-fibre web 4 of e.g. 150 g/m$^2$ comprising approximately 50 wt. pct. of the Fe-Cr-Al-Y-fibres and 50 wt. pct. stainless steel fibres and/or Inconel fibres. A web of stainless fibres 5 (AISI 300 or 400 series, 4-50 μm fibre diameter) will then be bonded to this mixed-fibre web 4 to give, among other things, the required strength to the membrane 1 and to realize the appropriate pressure drop for the fuel flow (shown by arrow 8) over the thickness of the membrane so that a stable combustion front is obtained. This required pressure drop is in general a function of, among other things, the thickness and permeability of the membrane and of the supply pressure and viscosity of the supplied fuel. For a radiant surface combustion burner for fuel gases, a membrane porosity of between 75% and 90% has been found to be suitable when the total membrane thickness measures 4–5 mm.

As shown in FIG. 2, the membrane 1 can also be executed in the shape of a hollow cylinder or beam with a bottom plate 9 at the end of the radiant burner opposite from the fuel-supply side 6. A membrane structure of mixed-fibre webs offers the special advantage of being easily pliable into the desired shape without delaminating, thus retaining its robust character. Cone or pyramid-shaped membranes (preferably truncated) can also be considered.

Through the concept of the invention, more or less porous ceramic elements can be efficiently and easily attached to a metal support such as e.g. abradable seals in turbine casings of jet engines. A thin layer of metal fibres (that can be joined to the material of the turbine casing by e.g. brazing) is covered with a mixed-fibre web of these metal fibres and of (active) Fe-Cr-Al-Y-fibres whereto is joined a thin web of 100% Fe-Cr-Al-Y-fibres. This laminate is sintered and covered on the active-fibre side with ceramic material (e.g. by plasma spraying techniques).

The whole structure is thereupon attached, e.g. by brazing, with its free metal-fibre side to these turbine-casing parts in the areas where the blade tips pass. In this embodiment, the laminated object according to the invention acts, consequently, as joining layer between a first (ceramic) material resistant to oxidation at high temperature and a second (metal) material, the active fibres adjacent to the first material also being resistant to oxidation at high temperature.

Another field of application of the invention relates to porous catalysts or catalyst carriers, wherein at least one web in the laminated object comprises catalytically active fibres. Through suitable mixed-fibre webs as intermediate layers, the catalytically active web can then be joined to a suitable carrier material. The application of Fe-Cr-Al-Y-alloys in catalyst carriers and coated with e.g. Pt as catalyst is known from U.S. Pat. No. 3,920,583.

Other applications are also conceivable. The laminated object can be part of porous electrodes applicable in electrolytic baths or as high-temperature resistant, sound-absorbing structures. The laminated object can also be applied as separating membrane when treating mixtures with a liquid phase finely divided in a gas phase or in another liquid phase, e.g. in sheets or as separating fillings in absorption or distillation towers. The active fibres will then have to possess a specific humidifying or hydrophylic affinity and/or chemical resistance.

For the application as resistance-heating element, the portion of active fibres will have a high electrical resistance. The porous laminated objects according to the invention can also be applied for heat transfer as in heat pipes or heat exchangers e.g. of the type described in U.S. Pat. No. 3,262,190. Magnetic fibres or steel wool can be utilised as active fibres for application in magnetic filtration.

Burner membranes can also be designed wherein ceramic fibres are blended with e.g. the Fe-Cr-Al-Y-fibres described above to reinforce the porous ceramic fibre layer. Indeed, ceramic fibre structures do not form strong bonds in their contact points upon heating or sintering. The provision however of metallic Fe-Cr-Al-Y-fibres in a blended arrangement with the ceramic fibres will create numerous strong metal sinter bonds at the mutual contact points of the metal fibres (resistant to oxydation at high temperature) distributed between the ceramic fibres and hence improve the thermal shock resistance of the composite membrane. A mixed web of ceramic fibres and e.g. Fe-Cr-Al-Y-fibres can be attached to a layer of active Fe-Cr-Al-Y-fibres resistant to oxydation at high temperature.

EXAMPLE

Active fibres of 22 micron diameter and composed of 16% Cr, 4.5% Al, 0.3% Y, 0.3% Si and the rest Fe were made by bundle drawing and were dry-processed into a fibre web in accordance with a method analogous to the one described in the British Pat. No. 1,190,844. A number of these webs are superposed and joined to a stack of similar fibre webs of AISI 316L stainless steel fibres (22 μm diameter) as non-active fibre layer. This joining is carried out by inserting between active and stainless steel fibre web stacks a mixed-fibre web with a weight of 150 g/m² and with an approximately equal part by weight therein of said active fibres and of the AISI 316L stainless steel fibres as non-active fibres. The whole has a weight of 4.5 kg/m² and is sintered at 1200° C. for 1 hour into a porous sheet with a porosity of 84.2% and a 4 mm thickness. The layer of active fibres in the sintered sheet has a thickness of 1.5 mm and the thickness of the adjacent layer of non-active fibres measures 2.5 mm. The sheet can be folded and unfolded quite easily and repeatedly without delamination appearing in the intermediate interface at the mixed-fibre web. This operation is not possible with similar sheets without mixed-fibre web; in other words, when folding repeatedly, delamination occurs between the layer of active fibres and the layer of non-active fibres. When folding the porous sheet into a tube, the sheet edges or rims to be joined in the longitudinal seam of the cylinder are joined by welding. To this end, a narrow longitudinal strip is removed before hand from the active-fibre web part near one of the said sheet rims and the other sheet rim is laid with the non-active fibre-web rim in the recess. This lap of both sheet rims can then be easily joined in the usual way by a welding operation.

The invention is not confined to dry-made laminated objects of metal fibre webs. The fibre webs can also be made by a wet lay down process, e.g. analogous to paper-making, a suspension of the fibres in a liquid being precipitated onto a filter cloth wherethrough the liquid is drained.

According to the invention, previously sintered layers of active fibres, having a certain porosity can now also be joined by sintering to previously sintered webs of non-active fibres having a porosity or permeability different from that of the layers of active fibres. For, when the non-sintered mixed-fibre webs inserted are joined by sintering to the other layers, they will be compressed and will form sufficient sintered contact points to realize a tight bond.

We claim:

1. A laminated fibrous object comprising:
a first web of sintered fibers of a selected composition and at least one other web of sintered fibers contiguous to and sintered to a side of said first web, the fibers of the other web comprising fibers of the same composition as those in the first web and fibers of a different composition.

2. The laminated fibrous object of claim 1, further comprising a support lamina contiguous and attached to said at least one other web on a side opposite said first web.

3. The laminated fibrous object of claim 2, wherein said support lamina is a web consisting of sintered fibers of said different composition.

4. The laminated fibrous object of claim 1, wherein the other web has a weight of at least 50 gm/m².

5. The laminated fibrous object of claim 1, wherein the concentration of fibers of the same composition as those in the first web and fibers of the different composition in said other web is approximately equal by weight.

6. The laminated fibrous object of claim 1, wherein the concentration of the fibers with a composition as those in the first web varies from a maximum at the boundary between said first web and said other web to a minima on the side thereof opposite the boundary.

7. The laminated fibrous object of claim 6, wherein the concentration of the fibers with a composition as those in the first web varies from a maximum of 75% at the boundary between said first web and said other web to a minima of 25% on the side thereof opposite the boundary.

8. The laminated fibrous object of claim 1, wherein the fibers in said first web are composed of a Fe-Cr-Al-Y alloy.

9. The laminated fibrous object of claim 1, wherein said fibers of different composition are composed of stainless steel.

10. The laminated fibrous object of claim 1, wherein the fibers in said first web are resistant to oxidation at high temperatures.

11. The laminated fibrous object of claim 1, wherein the fibers in said first web are catalytically active fibers.

12. The laminated fibrous object of claim 3, wherein said support lamina comprises fibers resistant to oxidation at high temperatures.

13. The laminated fibrous object of claim 3, wherein the fibers in said support lamina comprises catalytically active fibers.

14. The laminated fibrous object of claim 3, wherein said support lamina comprises stainless steel fibers.

15. The laminated fibrous object of claim 14, wherein the fibers in said first web are composed of a Fe-Cr-Al-Y alloy.

16. The laminated fibrous object of claim 12, wherein the fibers in said first web are composed of a Fe-Cr-Al-Y alloy.

17. The laminated fibrous object of claim 10, 12, or 16, wherein said fibers resistant to oxidation at high temperature are ceramic fibers.

18. The laminated fibrous object of claim 1, wherein the thickness of said first web of sintered fibers is between 1 and 2 mm.

19. The laminated fibrous object of claim 1, further comprising:
a second other web contiguous with and sintered to said first web on a side thereof opposite from said first-mentioned side of said first web of sintered fibers.

20. The laminated fibrous object of claim 1, further comprising an material resistant to oxidation at high temperature coating at least a portion of its surface area.

21. The laminated fibrous object of claim 20, wherein said material comprises a ceramic material.

* * * * *